April 23, 1929.  P. N. WALTERS  1,710,327
SAWING MECHANISM
Filed Nov. 2, 1927  8 Sheets-Sheet 1
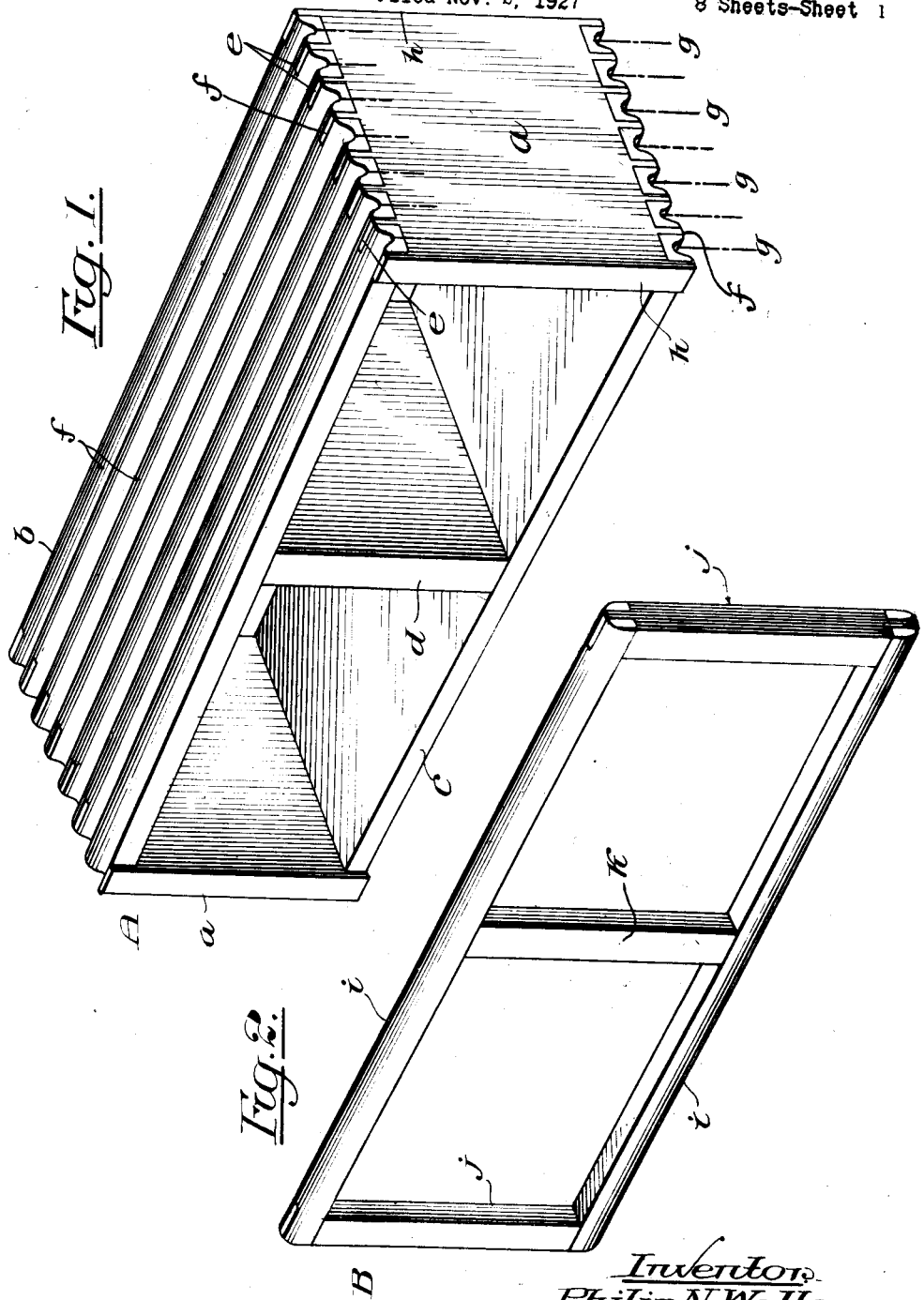
Inventor,
Philip N. Walters
by his Attorney
John R. Nolan

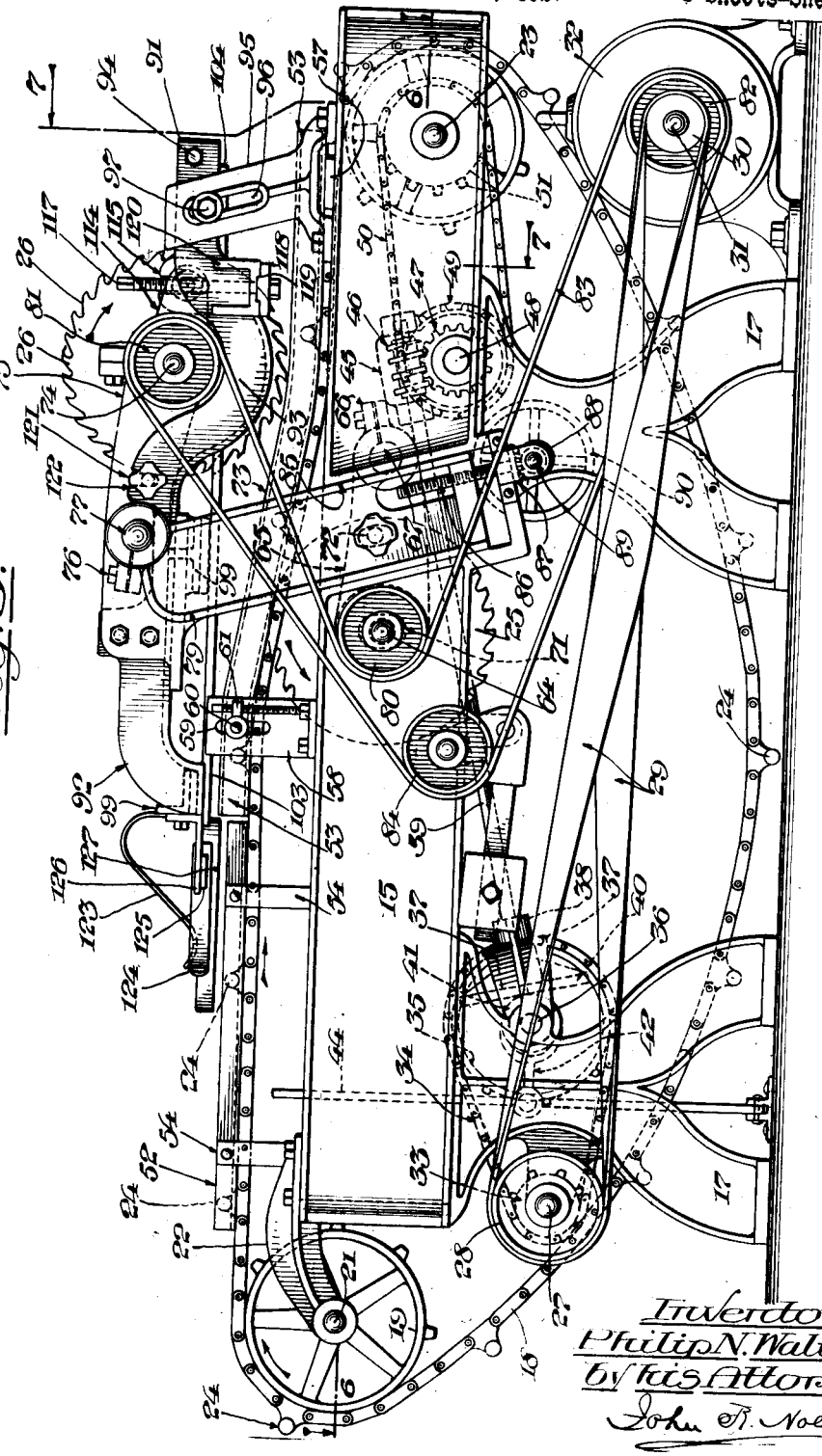

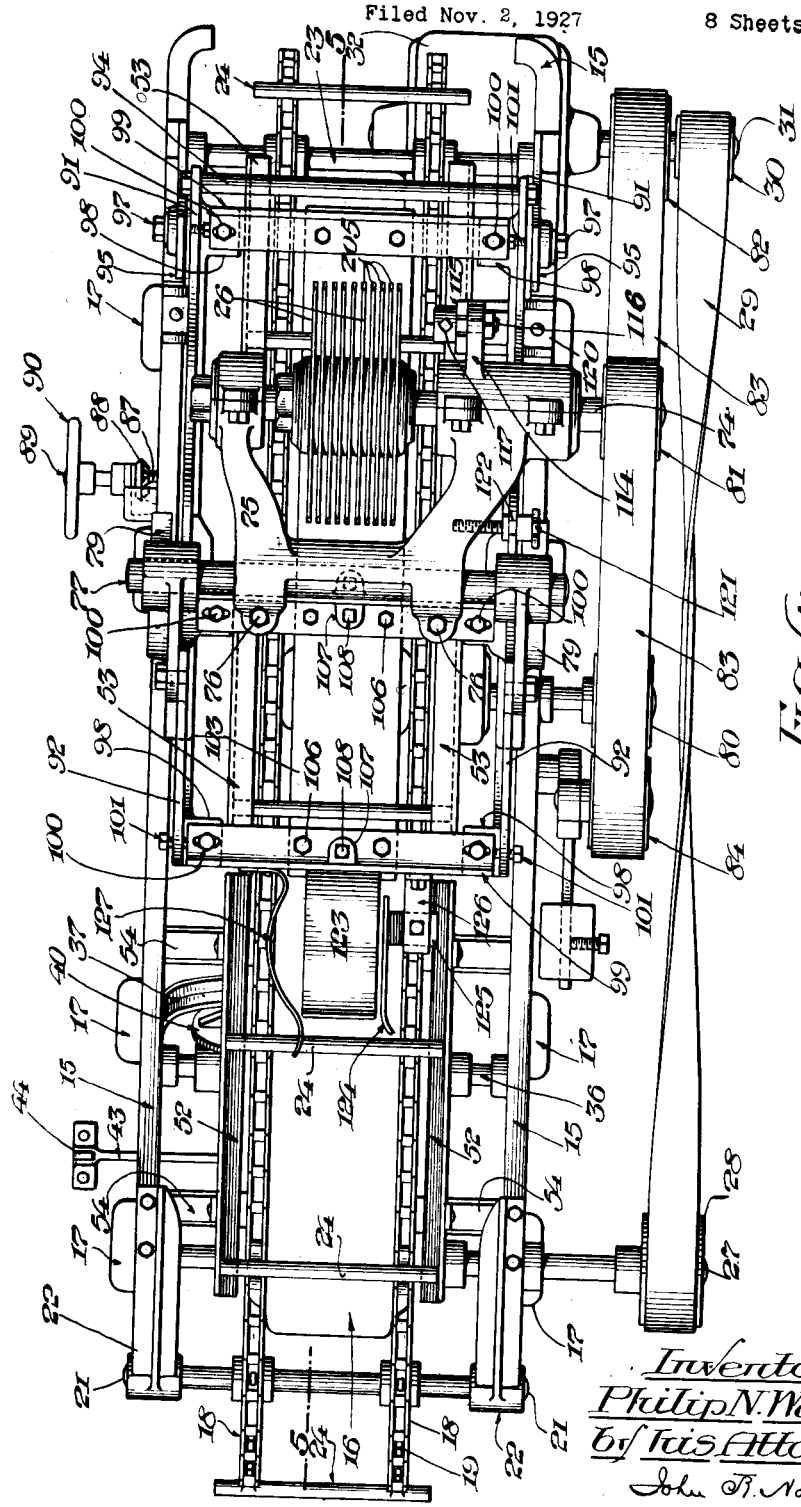

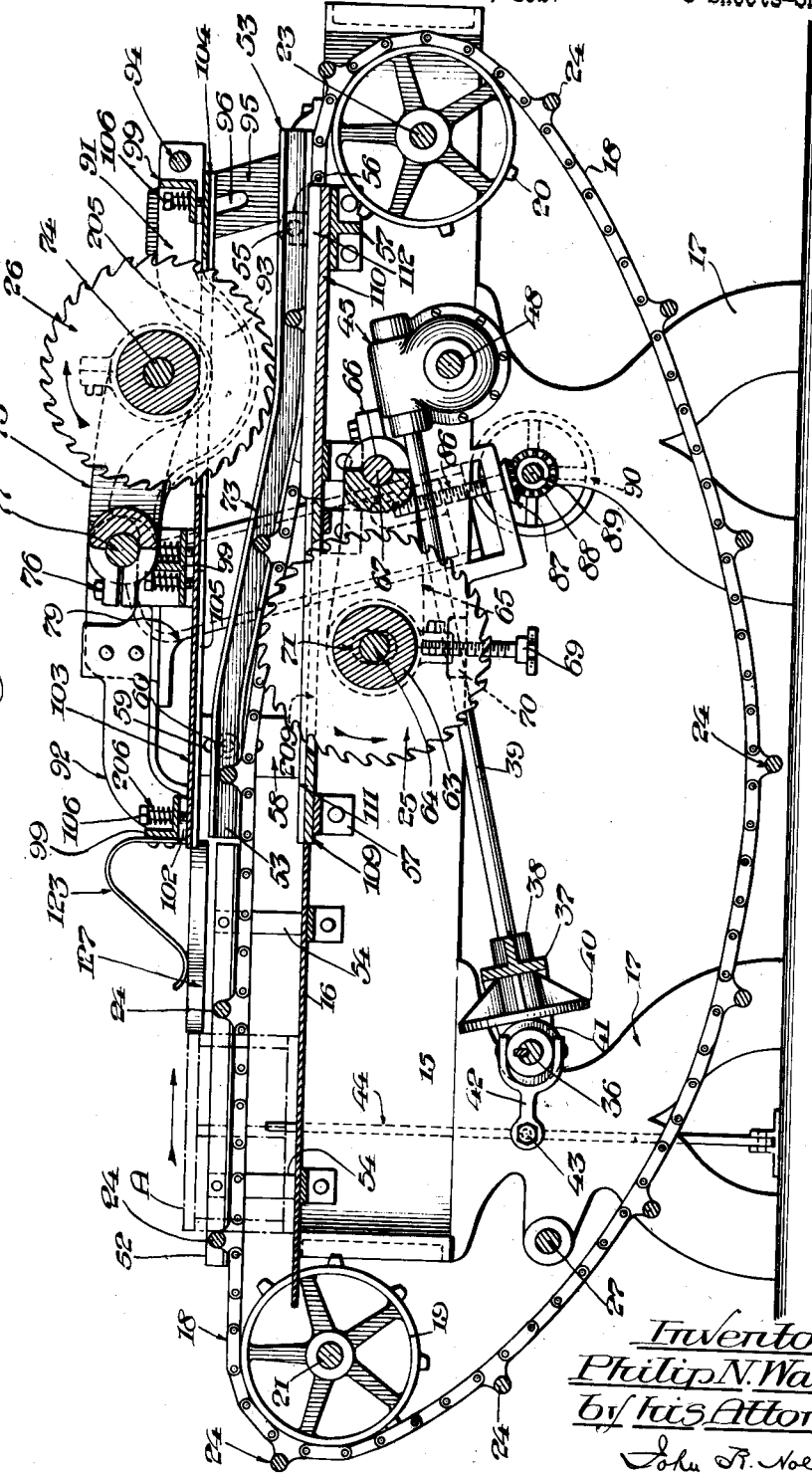

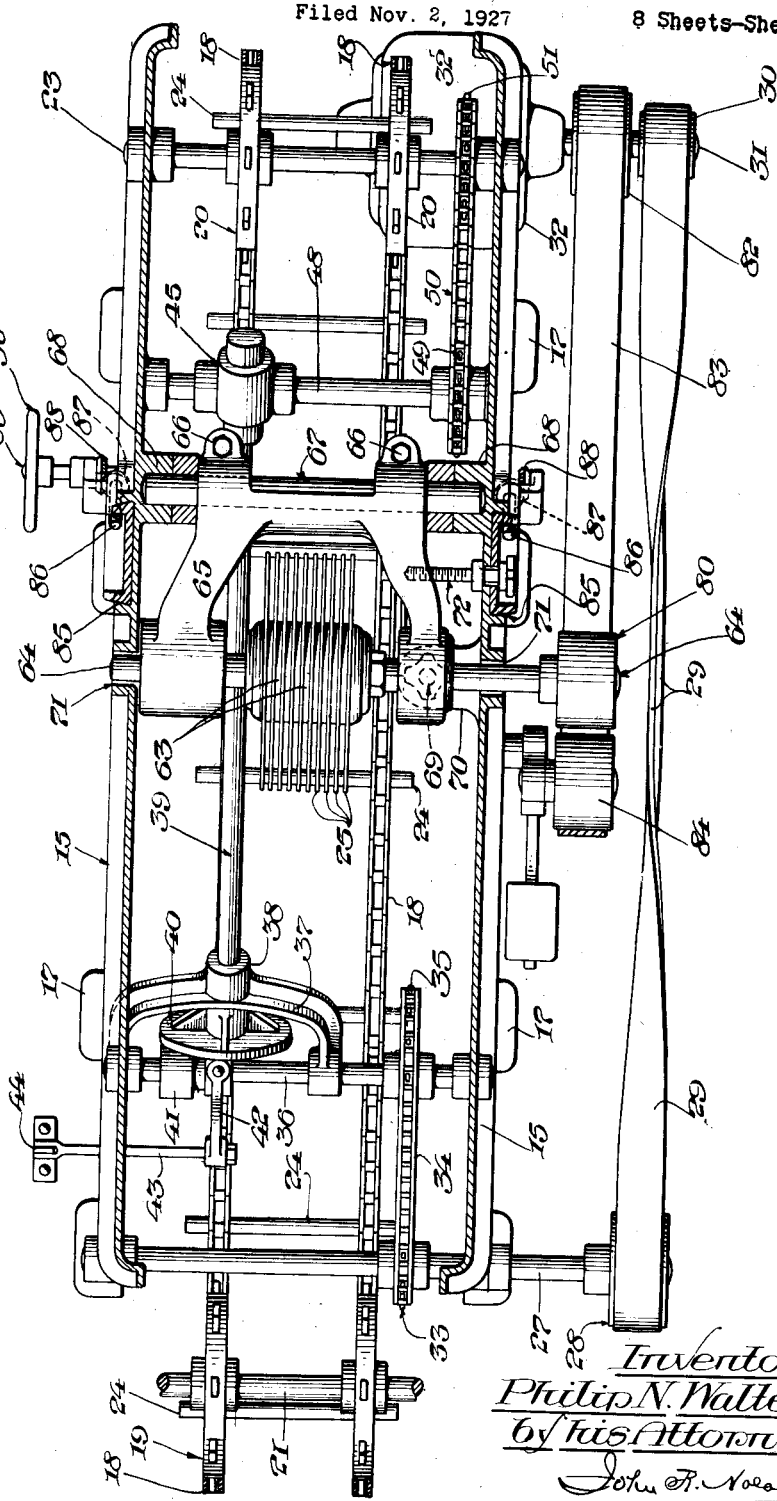

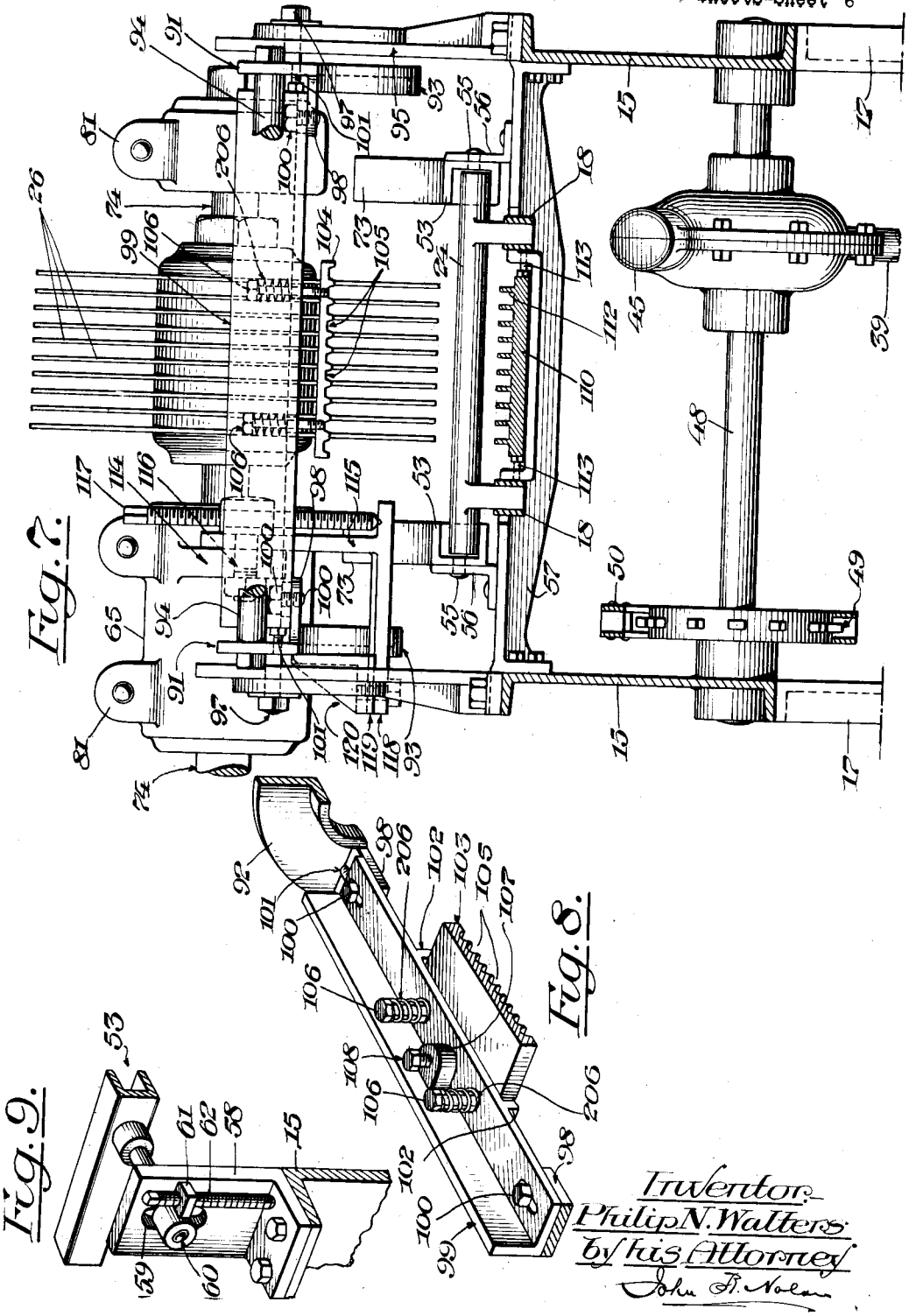

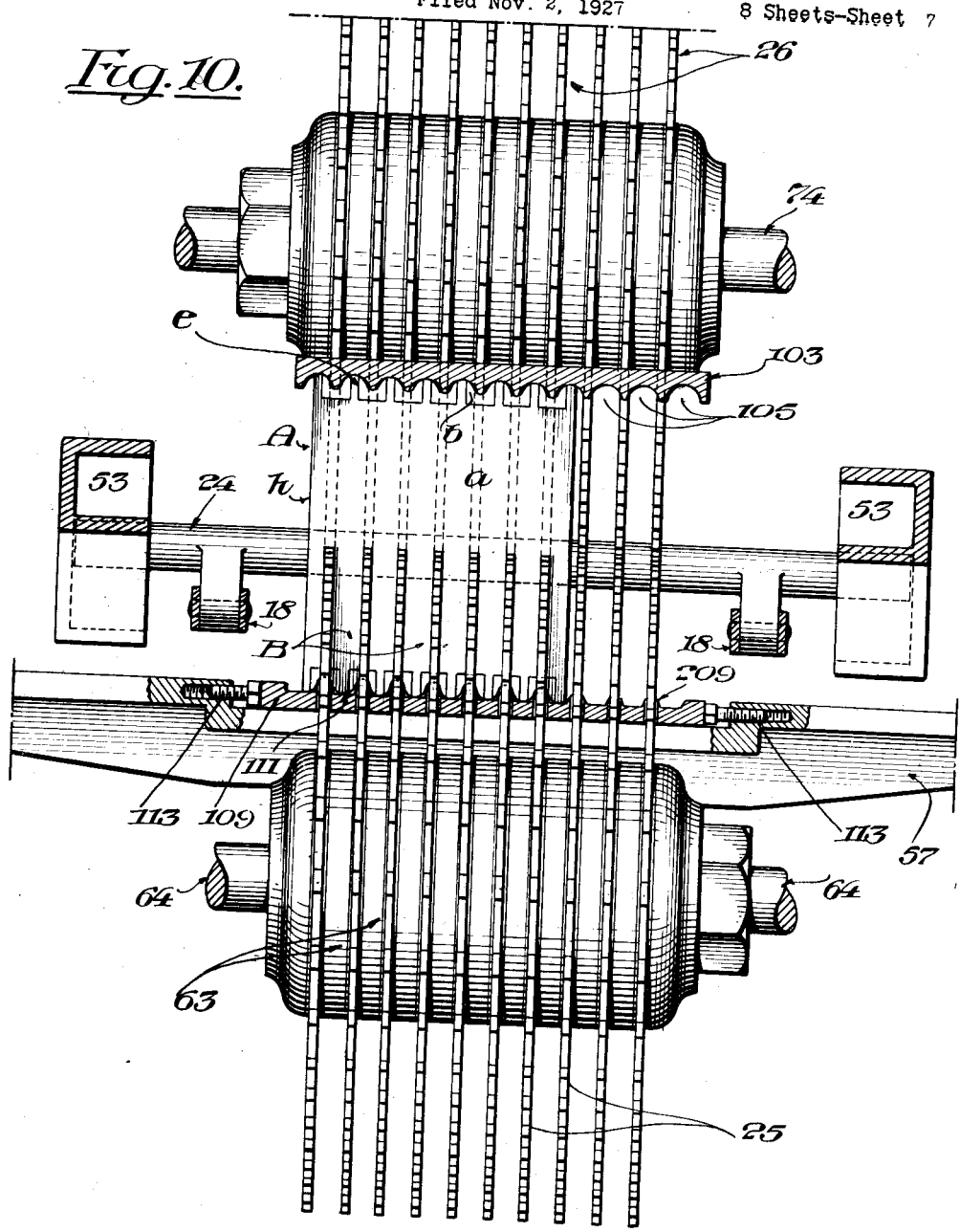

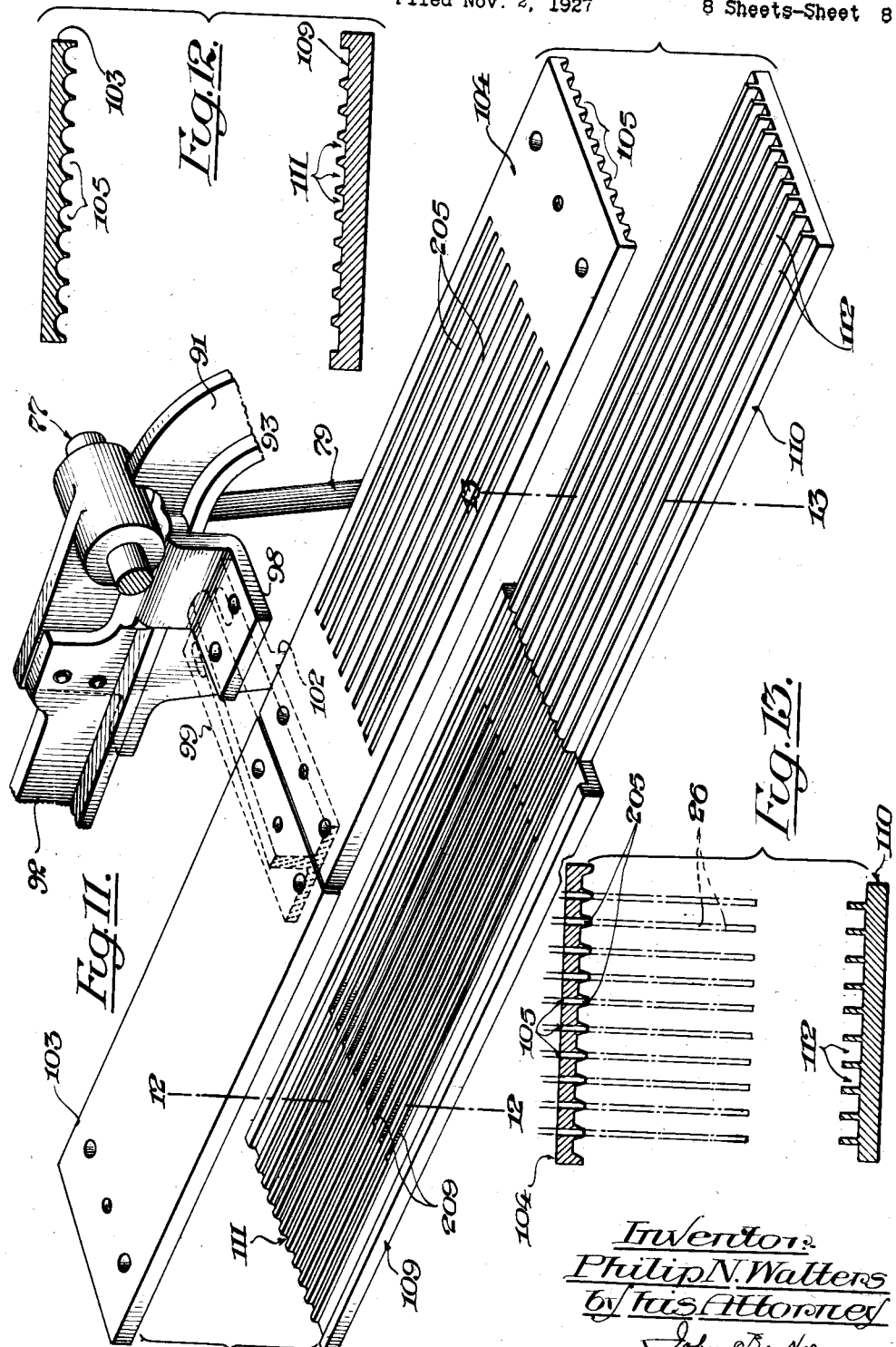

Patented Apr. 23, 1929.

1,710,327

UNITED STATES PATENT OFFICE.

PHILIP N. WALTERS, OF NEW YORK, N. Y., ASSIGNOR TO GACO CORPORATION, OF EAST GREENWICH, RHODE ISLAND, A CORPORATION OF RHODE ISLAND.

SAWING MECHANISM.

Application filed November 2, 1927. Serial No. 230,400.

This invention relates to sawing mechanism, and particularly, though not exclusively, to machines for simultaneously sawing a plurality of light cloth-board frames from a rectangular wooden structure of open box-like form having exteriorly fluted surfaces.

The principal object of the invention is to provide a machine of simple and efficient construction and operation whereby box-like structures are successively fed to the effective paths of two gangs of circular saws which are arranged to act in succession upon each structure in a manner to subdivide it rapidly and uniformly into a plurality of cloth-board or other skeleton frames.

Another object of the invention is to provide simple and efficient means for accurately supporting and guiding the box-like structures in their path to and past the saws.

Another object of the invention is to provide means for effecting various adjustments of the saws and guides in relation to each other and to the path of the travelling box-like structures.

With these and other objects in view the invention embodies novel features of construction and combinations of parts which will be hereinafter described, the scope of the invention then being defined in the appended claims.

In the annexed drawings—

Figure 1 is a perspective view of a rectangular wooden structure, or so-called box, adapted to be subdivided into cloth-board frames.

Fig. 2 is a perspective view of one of said frames.

Fig. 3 is a side elevation of a sawing machine embodying the preferred form of my invention.

Fig. 4 is a plan of the machine.

Fig. 5 is a longitudinal vertical section of the machine, as on the line 5—5 of Fig. 4.

Fig. 6 is a longitudinal horizontal section of the machine, as on the line 6—6 of Fig. 3.

Fig. 7 is a transverse vertical section of the machine, as on the line 7—7 of Fig. 3.

Fig. 8 is a perspective view of a portion of one of the upper guide plates for the box-like structures, showing the cross-bar support for the plate, and adjuncts.

Fig. 9 is a fragmentary view of an adjustable support for one of a pair of lateral channel bars for supporting and guiding the feed chains.

Fig. 10 is a partial vertical section through the lower and upper grooved guide plates, in a plane in front of the lower gang of circular saws, showing the chains, the channel bars therefor, and the upper gang of saws.

Fig. 11 is a perspective view of the upper and lower grooved guide plates, as detached, showing a portion of the frame for supporting the upper plates.

Fig. 12 is a transverse vertical section through the upper and lower guide plates, as on the line 12—12 of Fig. 11.

Fig. 13 is a similar section, as on the line 13—13 of Fig. 11.

The machine illustrated in the drawings is designed to subdivide a rectangular wooden structure, A, of the general character illustrated in Fig. 1 into a plurality of uniform cloth-board frames, B, such as represented in Fig. 2. The rectangular structure shown comprises two ends $a$; a top $b$; a bottom $c$, and a partition $d$ connecting the top and bottom intermediate the ends. The top and bottom members are mortised, as at $e$, to the respective ends, $a$, at regular intervals, each interval corresponding with the thickness of a cloth-board frame, and the exterior surfaces of the top and bottom are fluted to present longitudinal ribs, $f$, which define a series of cloth-board frames into which the structure is adapted to be subdivided by sawing it longitudinally in parallel planes indicated by the lines, $g$, in Fig. 1; saving that the outer sections, $h$, of the structure are discarded. The particular structure illustrated in Fig. 1 is designed to furnish six cloth-board frames; but, of course, the size and capacity of the structure may be reduced or increased as occasion may require. Each cloth-board frame embodies two parallel rails $i$; two end bars $j$, and a central cross brace $k$, which frame is adapted to be covered with paper to produce a light, hollow cloth-board, as usual.

The framework of the machine includes two parallel side beams 15; a bed plate 16 thereon, and supporting legs 17. A pair of spaced-apart endless chains 18 are mounted and arranged to pass about sprocket wheels 19, 20 located at the respective ends of the main frame, the upper runs of the chains travelling above and longitudinally of the frame, and the lower runs passing thereunder. The wheels 19 are fast on a shaft 21 having its bearings in brackets 22 extending from the left hand or receiving ends of the beams, and the wheels 20 are fast on a shaft 23 having its bearings in the beams at the right hand or delivery end of the machine. The chains are connected at intervals by cross-bars 24, constituting pushing members, which are designed successively to abut against structures, A, which are severally positioned, manually, on the bed 16 at the receiving end of the machine, (as indicated by the dotted lines at the left of Fig. 5), said bars thus impelling the structures to and past succeeding lower and upper complemental gangs of circular saws 25, 26, respectively, which conjointly subdivide each succeeding structure into a plurality of cloth-board frames B. These frames B are accurately guided in their travel to and past the two gangs of saws, as will hereinafter appear.

The chains 18 and cross-bars 24 constitute an endless feeder which may be continuously driven in any suitable manner. In the present instance the shaft 23 for the sprocket wheel 20 at the delivery end of the machine is operatively connected with and continuously driven from a suitably-disposed shaft 27 at the receiving end of the machine. The shaft 27 is illustrated as provided with a pulley 28 which is connected by means of a belt 29 with a pulley 30 on the shaft 31 of a suitably-located electric motor 32. On the shaft 27 is a sprocket wheel 33 which is connected by means of a chain 34 with a similar wheel 35 on an adjacent shaft 36, both shafts, 27, 36, having their bearings in the front legs 17. Hung on the shaft 36, adjacent one of the side beams, is a yoke 37 having a central bearing 38 for the lower end of a shaft 39 which inclines upwardly toward the rear of the machine. The lower end of the shaft 39 has fast thereon a disk 40 against which bears a brush wheel 41 that is splined on the shaft 36, so as to be movable toward and from the center of the disk. The hub of the brush wheel is jointed to a yoke arm 42 which is connected by means of a rod 43 with an upstanding lever 44, which lever may be manually operated to effect the radial adjustment of the brush wheel in respect to the disk, thus effecting and ensuring the transmission of the power from the shaft 36 to the shaft 39 at any predetermined speed. (See Figs. 3, 5 and 6.)

The upper end of the inclined shaft 39 is supported in a bearing case 45 loosely mounted on a cross-shaft 48 journaled in bearings in the side beams, and is provided with a worm 46 in mesh with a worm wheel 47 on the cross-shaft, which latter shaft bears a sprocket wheel 49 that is connected by means of a chain 50 with a similar wheel 51 fast on the shaft 23. Thus, motion is positively transmitted from the drive shaft 27 to the shaft 23 in a manner to actuate the feeder at any desired speed.

The forward sprocket wheels 19 are arranged to support the upper runs of the feeder chains some distance above the level of the bed 16, and the rearward wheels 20 are arranged to support these runs at a lower level. In their passage from the front to the rear sprocket wheels, the chains are guided horizontally to a plane adjacent to and in advance of the first or lower gang of circular saws 25 and are then inclined downwardly to a plane below the second or upper gang of saws 26, whence they are guided horizontally to the rear of the machine.

In the present instance, the upper run of the feeder is guided in the described path by means of suitably-disposed rail sections which receive the projecting ends of the cross-bars 24 of the feeder chains, and which sections comprise two horizontal angle bars 52 and two angulated channel bars 53. The bars 53 are suitably supported above the bed by posts 54 rising from the respective side beams. The lower rear ends of the bars 53 are pivoted, as at 55, to bracket lugs 56 fast on a rearward cross-bar of a series of bars 57 connecting the side beams, and the elevated forward end of the bars 53 are supported for vertical adjustment in brackets 58 fastened to the respective beams. Each of these brackets is provided with a vertical slot 59 through which extends a stud 60 projecting from the adjacent bar 53. This stud has fixed thereto a lateral lug 61 through which extends a vertical set-screw 62 that bears against the foot of the adjacent bracket, and hence by properly manipulating the set-screw 62 the free end of the guide bar 53 can be nicely adjusted vertically and aligned with the adjacent horizontal guide bar 52. (See Figs. 5, 7 and 9.)

The adjacent saws of each gang are spaced apart correspondingly to the width of a cloth-board frame B, the number of saws in the gang thus determining the number of boards to be produced from each succeeding rectangular structure A.

The saws 25 of the lower gang, in alternation with spacers 63, are centrally mounted and clamped on an arbor 64 which is journaled in bearings in the legs of a yoke 65 that is clamped, as at 66, on a pivot shaft 67 having its bearings 68 in the side beams. One of the bearings of the yoke is supported by a set-screw 69 which, being mounted in a lug 70 on the adjacent side beam, may be manipulated to set the yoke, together with the saws, in any desired position of vertical adjustment. The arbor 64 passes through apertures 71 in the side beams, which apertures are elongated to permit the vertical movement of the arbor while the yoke and saws are being adjusted. (See Fig. 5.) The saws 25 project through openings in a horizontal guide plate hereinafter described, which forms, in effect a continuation of the bed 16, so as to intercept the rectangular structure, A, as it is being advanced by the feeder. The effective peripheries of the saws are positioned to kerf the structure slightly more than one-half the height of the latter. By the saw mounting just described, the saws may be nicely adjusted to vary the depth of their cuts in accordance with the requirements of any particular size of cloth-board frame. In order that the gang of saws 25 may be horizontally adjusted with relation to the path of the travelling box-like structure A, as occasion may require, a set-screw 72 is mounted in one of the side beams and screwed into the adjacent leg of the yoke 65, the aperture in the beam for the passage of the set-screw being suitably elongated. (See Fig. 6.) The feeder chains and their cross-bars, as they approach and pass the gang of saws 25, are guided downwardly by the inclined portions 73 of the lateral rail sections 53, so that when the lower portion of the structure A has been longitudinally kerfed in parallel vertical planes, the chains, together with the cross-bars 24, pass below and carry the structure to the path of the second gang of saws 26.
As the structure A is being advanced to the first gang of saws, a cross-bar 24 of the feeder is bearing squarely against the upper portion of the opposing end of the structure and is being guided by the horizontal rails 52; and as the progressing structure engages and passes through the saws the ends of the abutting cross-bar enter the rails 53 and are guided thereby horizontally, downwardly and rearwardly. Such bar in its descent passes to the lower portion of the opposing end of the structure A, and in its continued rearward travel clears the tops of the first gang of saws and passes horizontally below and beyond the second gang.
The saws 26 of the second gang correspond in number and spaced relation to the saws of the lower gang and are arranged to engage the advancing structure and saw its upper portion in alignment with the kerfs produced by the lower saws, the upper kerfs merging with the lower kerfs and completing the severance of the structure A into a plurality of cloth-board frames B; it being noted that the outside saws of each gang trim the lateral sections $h$ from the structure.
From the foregoing it will be seen that as the box-like structure, A, enters and passes through the path of the lower gang of saws the pushing force of the acting cross-bar of the feeder is exerted against and across the upper portion of the structure, thus effecting the maximum pressure of the lower portion of the structure uniformly against the first gang of saws, and thereby ensuring the efficient initial kerfing of the structure.
It will also be seen that as the structure enters and passes through the path of the upper gang of saws, the pushing force of the cross-bar is exerted against and across the lower kerfed portion of the structure, thus similarly effecting the maximum pressure of the upper portion of the structure uniformly against the second gang of saws and ensuring the efficient final sawing operation. Hence the feeding and sawing operations are rapidly accomplished, and a plurality of light cloth-board frames of uniform construction are simultaneously produced from the structure.

The saws 26 of the second gang are mounted on an arbor 74 having its bearings in an overhanging yoke 75 which is clamped, as at 76, to a pivot shaft 77 that is supported at its ends in uprights 79 rising from the respective side beams. These uprights support an overhanging frame with which is associated means for guiding the structure and its subdivisions, and also means for laterally and vertically adjusting the gang of saws 26 with respect to the path of the rectangular structure, as will be hereinafter described.
Any suitable means for concurrently operating the two gangs of saws may be employed. In the present instance the arbors 64, 74 are provided with pulleys 80, 81, respectively about which and a pulley 82 on the motor shaft 31, is trained a belt 83, a suitable tension pulley 84 for the guidance of which belt is arranged adjacent the pulley 80. (See Figs. 3 and 4.)
The uprights 79 previously referred to
are slidably mounted in guide-ways 85 in the outer sides of the beams 15, and in the foot of each guide-way is mounted a rotatable set-screw 86 which is screwed into the lower end of the adjacent upright. Each set-screw 86 carries a bevel gear 87 in mesh with a similar gear 88 fast on a transverse shaft 89 which is journaled in the adjacent legs 17, and one end of the shaft 89 is provided with a hand wheel 90, by the manipulation of which the shaft 89 can be rotated, thus concurrently rotating through the pairs of meshing gears the set-screws 86 in a manner to effect either upward or downward adjustment of the two lateral uprights 79 and their
appurtenances, as desired. (See Figs. 3 and 6.)
Bolted to the upper portions of the respective uprights, and vertically adjustable therewith, is a supporting frame comprising parallel side members each composed of rearwardly and forwardly extending sections 91, 92, respectively, the rearwardly extending sections being curved, as at 93, so as to clear the hubs of the yoke 75 and being connected at their outer ends by a tie-rod 94. These ends of the members 91 extend adjacent to and are supported by a pair of brackets 95 bolted to the respective side beams, the brackets having elongated openings 96 therein for the passage of bolts 97, whereby the rearward end of the frame can be firmly secured in any predetermined position of vertical adjustment. (See Figs. 3, 4 and 5.) The side members of this vertically adjustable frame are formed adjacent their front and rear ends and in the vicinity of the shaft 77, with inwardly extending lugs 98 to which parallel cross-bars 99 are secured by means of bolts 100. The bolt holes in the respective bars 99 are elongated to permit limited adjustment of the bars, or any of them, transversely of the machine. Set-screws 101 mounted in the side members of the frame and bearing against the opposing ends of the respective bars afford simple means for adjusting the bars, which bars, when adjusted, can be secured in place by tightening the bolts 100.

The undersides of the respective bars 99 are transversely channelled, as at 102, midway between their ends, to receive guide plates 103, 104 which overhang the path of the structure A, as the latter approaches and passes through the effective paths of the two gangs of circular saws. The undersides of these plates are formed with aligning longitudinal grooves 105 which correspond with and receive the longitudinal ribs on the fluted upper surface of the structure, thereby effectually guiding the structure to and across the paths of the respective gang of saws in a manner to ensure the parallelism of the series of cloth-board frames into which the structure is subdivided; it being noted that the rearward guide plate 104 is appropriately slotted, as at 205. intermediate the adjacent grooves, to permit the free passage of the circular saws 26.

The guide plates 103, 104 are adjustably supported by means of screws 106 (Figs. 4 and 8) which pass loosely through orifices in the respective bars 99 and are screwed at their lower ends into the adjacent plates, springs 206 which encircle the shanks of the respective screws, being interposed between the plates and the heads of the screws. The forward and middle bars 99 are provided midway between their respective pairs of supporting screws 106 with lugs 107 having therein vertical set-screws 108 which bear upon the adjacent ends of the plates. Hence by manipulating the respective set-screws 108 the plates 103. 104 can be adjusted to the proper level of the upper fluted surface of the structure A; and by manipulating the set-screw 101 the bars 99 can be laterally adjusted to position the grooves of the respective plates in alignment to receive and guide the fluted top of the structure A as it progresses toward and past the paths of the saws.

In addition to the upper plates 103, 104 lower guide plates 109, 110 for the structure A are provided, which plates are supported on cross-bars, 57, of the main frame so as to constitute, in effect, a continuation of the bed 16. The plates 109, 110 are formed in their upper surfaces with parallel grooves 111, 112 adapted to receive the longitudinal ribs of the lower fluted surface of the structure A, the plate 109 being appropriately slotted, as at 209, intermediate the adjacent grooves, to permit the free passage of the lower circular saws 25. The plates 109, 110 are held in place by means of set-screws 113 which are mounted in the cross-bars 57 so as to bear against the opposing edges of the plates. By properly manipulating the set-screws 113 the plates can be accurately positioned in longitudinal alignment with each other and in vertical alignment with the guide grooves of the upper plates 103, 104. (See Figs. 7 and 10.)

Preferably the walls of the grooves of the plate 110 are of greater depth than those of the grooves of plates 109, in order to ensure the efficient lateral support of the partially severed cloth-board frames and maintain them in parallelism while the structure is being acted upon by the upper gang of saws. The upper and lower guide plates support the cloth-board frames and maintain them in close parallel relation as the frames leave the second gang of saws, thus facilitating the removal and packing of the frames.

The means hereinbefore referred to for laterally and vertically adjusting the second gang of saws 26, is preferably as follows: One of the hubs of the yoke 75 is provided with a rearwardly extending ear 114 which is adjustably connected to the vertical member 115 of an L-post by means of a bolt 116 having in its head a tapped hole in which is screwed a vertical adjusting screw 117. The lower end of this screw bears against the base 118 of the post, which base extends outwardly and is slidably fitted to a guide-way 119 in the foot of a projection 120 on the adjacent frame section 91, so as to permit lateral adjustment of the yoke and the saws. Such adjustment is effected by means of a set-screw 121 which is mounted in the adjacent leg of the yoke and is seated in a slot 122 in the section 91. Vertical adjustment of the yoke and saws is effected by releasing the clamps 76 between the yoke and its pivot shaft 77, and then manipulating the vertical adjusting screw 117. (See Figs. 3, 4 and 7.)

As a simple and efficient means to maintain the travelling structure, A, on the bed 16, and also to guide such structure to the upper and lower guide plates in advance of the first gang of saws, a bowed spring 123 is secured to the forward cross-bar 99 so as to overhang and press yieldingly upon the top of the structure; and two spaced-apart side guides for the structure are arranged in advance of the bar 99. One of these side guides comprises a horizontal strip, 124, having a lateral extension, 125, which is bolted to a bracket, 126, extending from the forward bar 99 so as to afford a guide for the adjacent side of the structure, and the other guide consists of a bowed spring 127 fastened to the bar 99, and spaced from the strip 124 so as to bear yieldingly against the opposing side of the structure. (See Figs. 3, 4 and 5.)

It is to be understood that my invention is not limited to the particular exemplifying form or forms of mechanism herein disclosed, as the mechanism may be variously modified within the principle of the invention and the scope of the appended claims.

I claim—

1. In sawing mechanism, the combination with two complemental gangs of circular saws arranged in spaced relation and adapted successively to act upon opposite portions of an object, whereby one portion is kerfed by the first gang of saws and the other portion is sawed in alignment with the kerfs by the second gang of saws, said saws being so spaced that the kerfs produced by one gang merge with the kerfs produced by the other gang, of feeding means including a travelling pushing member which acts against and across one portion of the object beyond the effective path of the first gang of saws, and then similarly acts upon the kerfed portion of the object beyond the effective path of the second gang of saws, and means whereby the said pushing member is moved from one position to another with respect to the paths of the two gangs of saws.

2. In sawing mechanism, the combination with two complemental gangs of circular saws arranged in spaced relation and adapted successively to act upon opposite portions of an object, whereby one portion is kerfed by the first gang of saws and the other portion is sawed in alignment with the kerfs by the second gang of saws, said saws being so spaced that the kerfs produced by one gang merge with the kerfs produced by the other gang, of feeding means comprising parallel chains and cross-bars connecting said chains at intervals and operative to bear against succeeding objects to be subdivided and force them through the effective paths of the two gangs of saws, and means for guiding said chains from one position to another with respect to the paths of the two gangs of saws whereby the cross-bars are caused to escape the respective saws.

3. In sawing mechanism, the combination with two complemental gangs of circular saws arranged in spaced relation and adapted successively to act upon opposite portions of an object, whereby one portion is kerfed by the first gang of saws and the other portion is sawed in alignment with the kerfs by the second gang of saws, said saws being so spaced that the kerfs produced by one gang merge with the kerfs produced by the other gang, of feeding means comprising parallel chains and cross-bars connecting said chains at intervals and operative to bear against succeeding objects to be subdivided and force them through the effective paths of the two gangs of saws, means for guiding said chains from one position to another with respect to the paths of the two gangs of saws whereby the cross-bars are caused to escape the respective saws, and means for longitudinally guiding the said object in parallel planes corresponding with the planes of subdivision of the object.

4. In sawing mechanism, the combination with two complemental gangs of circular saws arranged in spaced relation and adapted successively to act upon opposite portions of an object, whereby one portion is kerfed by the first gang of saws and the other portion is sawed in alignment with the kerfs by the second gang of saws, said saws being so spaced that the kerfs produced by one gang merge with the kerfs produced by the other gang, of feeding means comprising parallel chains and cross-bars connecting said chains at intervals and operative to bear against succeeding objects to be subdivided and force them through the effective paths of the two gangs of saws, means for guiding said chains from one position to another with respect to the paths of the two gangs of saws whereby the cross-bars are caused to escape the respective saws, and means for effecting independent adjustment of said gangs of saws in planes at right angles to their axes of rotation.

5. In sawing mechanism, the combination with two complemental gangs of circular saws arranged in spaced relation and adapted successively to act upon opposite portions of an object, whereby one portion is kerfed by the first gang of saws and the other portion is sawed in alignment with the kerfs by the second gang of saws, said saws being so spaced that the kerfs produced by one gang merge with the kerfs produced by the other gang, of feeding means comprising parallel chains and cross-bars connecting said chains at intervals and operative to bear against succeeding objects to be subdivided and force them through the effective paths of the two gangs of saws, means for guiding said chains from one position to another with respect to the paths of the two gangs of saws whereby the cross-bars are caused to escape the respective saws, means for effecting independent adjustment of said gangs of saws in planes at right angles to their axes of rotation, and means for effecting independent adjustment of said gangs of saws in planes longitudinally of their axes of rotation.

6. In sawing mechanism, the combination with two complemental gangs of circular saws arranged in spaced relation and adapted successively to act upon opposite portions of a box-like structure having exteriorly fluted surfaces, whereby one portion is kerfed by the first gang of saws and the other portion is sawed in alignment with the kerfs by the second gang of saws, said saws being so spaced that the kerfs produced by one gang merge with the kerfs produced by the other gang, of feeding means including a travelling pushing member which acts against and across one portion of the structure beyond the effective path of the first gang of saws, and then similarly acts upon the kerfed portion of the structure beyond the effective path of the second gang of saws, means whereby the said pushing member is moved from one position to another with respect to the two gangs of saws, and spaced-apart longitudinally grooved guide plates with which the fluted surfaces of the structure respectively register in the passage of the structure to and through the effective paths of the two gangs of saws.

7. In sawing mechanism, the combination with two complemental gangs of circular saws arranged in spaced relation and adapted successively to act upon opposite portions of a box-like structure having exteriorly fluted surfaces, whereby one portion is kerfed by the first gang of saws and the other portion is sawed in alignment with the kerfs by the second gang of saws, said saws being so spaced that the kerfs produced by one gang merge with the kerfs produced by the other gang, of feeding means including a travelling pushing member which acts against and across one portion of the structure beyond the effective path of the first gang of saws, and then similarly acts upon the kerfed portion of the structure beyond the effective path of the second gang of saws, means whereby the said pushing member is moved from one position to another with respect to the two gangs of saws, spaced-apart longitudinally grooved guide plates with which the fluted surfaces of the structure respectively register in the passage of the structure to and through the effective paths of the two gangs of saws, and means for relatively adjusting said guide plates toward or from each other.

8. In sawing mechanism, the combination with two complemental gangs of circular saws, whereof one gang is arranged in advance of the other and at a lower level, and means for operating said saws, said saws being so spaced that the kerfs produced by one gang merge with the kerfs produced by the other gang, of feeding means comprising parallel chains and cross-bars connecting said chains at intervals and operative to bear against succeeding objects to be subdivided in vertical planes and force them through the effective paths of the two gangs of saws, whereby the upper and lower portions of each object are sawed in succession, and means for guiding said chains from a higher to a lower level to cause the said cross-bars, while in contact with the objects, to pass over the first gang of saws and then under the second gang of saws.

9. In sawing mechanism, the combination with two complemental gangs of circular saws, whereof one gang is arranged in advance of the other and at a lower level, and means for operating said saws, said saws being so spaced that the kerfs produced by one gang merge with the kerfs produced by the other gang, of feeding means comprising parallel chains and cross-bars connecting said chains at intervals and operative to bear against succeeding objects to be subdivided in vertical planes and force them through the effective paths of the two gangs of saws, whereby the upper and lower portions of each object are sawed in succession, and means for guiding said chains from a higher to a lower level to cause the said cross-bars, while in contact with the objects, to pass over the first gang of saws and then under the second gang of saws, said last-named means including parallel, horizontal and angulated members extending longitudinally of and adjacent to the upper runs of the chains.

10. In sawing mechanism, the combination with two complemental gangs of circular saws, whereof one gang is arranged in advance of the other and at a lower level, and means for operating said saws, said saws being so spaced that the kerfs produced by one gang merge with the kerfs produced by the other gang, of feeding means comprising parallel chains and cross-bars connecting said chains at intervals and operative to bear against succeeding objects to be subdivided in vertical planes and force them through the effective paths of the two gangs of saws, whereby the upper and lower portions of each object are sawed in succession, and means for guiding said chains from a higher to a lower level to cause the said cross-bars, while in contact with the objects, to pass over the first gang of saws and then under the second gang of saws, said last-named means including a pair of horizontal guide members extending longitudinally of and adjacent the upper runs of the chains, in advance of the first gang of saws, and a pair of angulated guide members extending longitudinally of and adjacent the upper runs of the chains from the vicinity of the first gang of saws to a location in rear of the second gang of saws, and means for vertically adjusting the angulated members in relation to the horizontal members.

11. In sawing mechanism, the combination with two complemental gangs of circular saws, whereof one gang is arranged in advance of the other and at a lower level, and means for operating said saws, said saws being so spaced that the kerfs produced by one gang merge with the kerfs produced by the other gang, of feeding means including a travelling pushing member adapted and arranged to act against the front end of a box-like structure having exteriorly fluted surfaces and force it through the effective paths of the two gangs of saws, whereby the lower and upper portions of said structure are sawed in succession, means whereby the said member while in contact with the structure is caused to pass over the first gang of saws and under the second gang of saws, and upper and lower longitudinally grooved guide members with which the fluted surfaces of the structure respectively register in the passage of the structure to and through the effective paths of the two gangs of saws.

Signed at city of New York in the county and State of New York, this 29th day of October, A. D. 1927.

PHILIP N. WALTERS.